United States Patent
Palakurthy

(10) Patent No.: US 10,991,000 B2
(45) Date of Patent: Apr. 27, 2021

(54) ADVERTISEMENT DISTRIBUTION SYSTEM, METHOD AND COMPUTER PROGRAM PRODUCT USING A MULTI-TENANT ON-DEMAND DATABASE SYSTEM

(71) Applicant: salesforce.com, inc, San Francisco, CA (US)

(72) Inventor: Sridhar Palakurthy, Marietta, GA (US)

(73) Assignee: salesforce.com, inc., San Francisco, CA (US)

( * ) Notice: Subject to any disclaimer, the term of this patent is extended or adjusted under 35 U.S.C. 154(b) by 532 days.

(21) Appl. No.: 13/770,952

(22) Filed: Feb. 19, 2013

(65) Prior Publication Data
US 2013/0238428 A1 Sep. 12, 2013

Related U.S. Application Data

(60) Provisional application No. 61/609,200, filed on Mar. 9, 2012.

(51) Int. Cl.
*G06Q 30/00* (2012.01)
*G06Q 30/02* (2012.01)
*G05B 19/418* (2006.01)

(52) U.S. Cl.
CPC .................. *G06Q 30/0241* (2013.01)

(58) Field of Classification Search
CPC ................................. G06Q 30/0241
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

"An Efficient Schema Shared Approach for Cloud Based Multitenant Database with Authentication and Authorization Framework". (Year: 2011).*

*Primary Examiner* — Maria V Vanderhorst
(74) *Attorney, Agent, or Firm* — Kowert, Hood, Munyon, Rankin & Goetzel, P.C.

(57) ABSTRACT

In accordance with embodiments, there are provided mechanisms and methods for advertisement distribution using a multi-tenant on-demand database system. These mechanisms and methods for distributing advertisements using a multi-tenant on-demand database system can integrate an advertisement distribution service with the services provided by the multi-tenant on-demand database system. The ability to provide an advertisement distribution service with the services provided by the multi-tenant on-demand database system can enable the distribution of advertisements to take advantage of other data stored by and/or services provided by the multi-tenant on-demand database system.

13 Claims, 6 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 8,015,495 B2 | 9/2011 | Achacoso et al. |
| 8,065,327 B2 * | 11/2011 | Rosenfield .......... G06F 17/3089 707/781 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,346,747 B2 * | 1/2013 | Liu .................. G06F 17/30575 707/705 |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2006/0235715 A1 * | 10/2006 | Abrams .................. G06Q 40/04 705/1.1 |
| 2008/0189169 A1 * | 8/2008 | Turpin .................... G06Q 30/02 705/7.33 |
| 2008/0249972 A1 | 10/2008 | Dillon |
| 2008/0270459 A1 * | 10/2008 | Grewal ............ G06F 17/30566 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0265243 A1 * | 10/2009 | Karassner .............. G06Q 30/02 705/14.54 |
| 2010/0211466 A1 * | 8/2010 | Clarke-Martin ....... G06Q 30/02 705/14.53 |
| 2010/0324992 A1 * | 12/2010 | Birch .......................... 705/14.49 |
| 2011/0218958 A1 * | 9/2011 | Warshavsky .............. G06N 5/00 706/54 |
| 2011/0238688 A1 * | 9/2011 | Mercuri ............... G06F 17/3089 707/769 |
| 2011/0247051 A1 | 10/2011 | Bulumulla et al. |
| 2012/0042218 A1 | 2/2012 | Cinarkaya et al. |
| 2012/0054002 A1 * | 3/2012 | Rotbard et al. .............. 705/14.3 |
| 2013/0159094 A1 * | 6/2013 | McClelland ....... G06Q 30/0269 705/14.49 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

| | | |
|---|---|---|
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

ADVERTISEMENT DISTRIBUTION SYSTEM, METHOD AND COMPUTER PROGRAM PRODUCT USING A MULTI-TENANT ON-DEMAND DATABASE SYSTEM

CLAIM OF PRIORITY

This application claims the benefit of U.S. Provisional Patent Application 61/609,200 entitled "Cloud Advertising," by Sridhar Palakurthy, filed Mar. 9, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of the Invention

One or more implementations relate generally to electronic-based advertising.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

To date, advertisers have largely taken advantage of electronic-based communications (e.g. over the Internet or other network) to advertise to target users. Unfortunately, the services provided to advertisers for such electronic-based advertising have exhibited various limitations. For example, while in the past users of a company, organization, etc. have accessed their data resources in one logical database including retrieving data from and storing data using the company's, organization's, etc. own systems, more recently cloud based data storage has become accessible to users where databases and/or other resources associated therewith may be shared amongst users of various companies, organizations, etc. In general, however, electronic-based advertising has not yet been integrated as a service with such cloud based data storage systems.

Accordingly, it is desirable to provide techniques enabling electronic-based advertising in association with cloud based data storage systems.

BRIEF SUMMARY

In accordance with embodiments, there are provided mechanisms and methods for advertisement distribution using a multi-tenant on-demand database system. These mechanisms and methods for distributing advertisements using a multi-tenant on-demand database system can enable embodiments to integrate an advertisement distribution service with the services provided by the multi-tenant on-demand database system. The ability of embodiments to provide an advertisement distribution service with the services provided by the multi-tenant on-demand database system can enable the distribution of advertisements to take advantage of other data stored by and/or services provided by the multi-tenant on-demand database system.

In an embodiment and by way of example, a method for advertisement distribution using a multi-tenant on-demand database system is provided. The method embodiment includes receiving an advertisement by a multi-tenant on-demand database system; storing the advertisement in a database of the multi-tenant on-demand database system; and distributing the advertisement with content of a tenant of the multi-tenant on-demand database system to at least one target user.

While one or more implementations and techniques are described with reference to an embodiment in which advertisement distribution is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for advertisement distribution using a multi-tenant on-demand database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing advertisement distribution using a multi-tenant on-demand database system will be described with reference to example embodiments.

Figure 1:
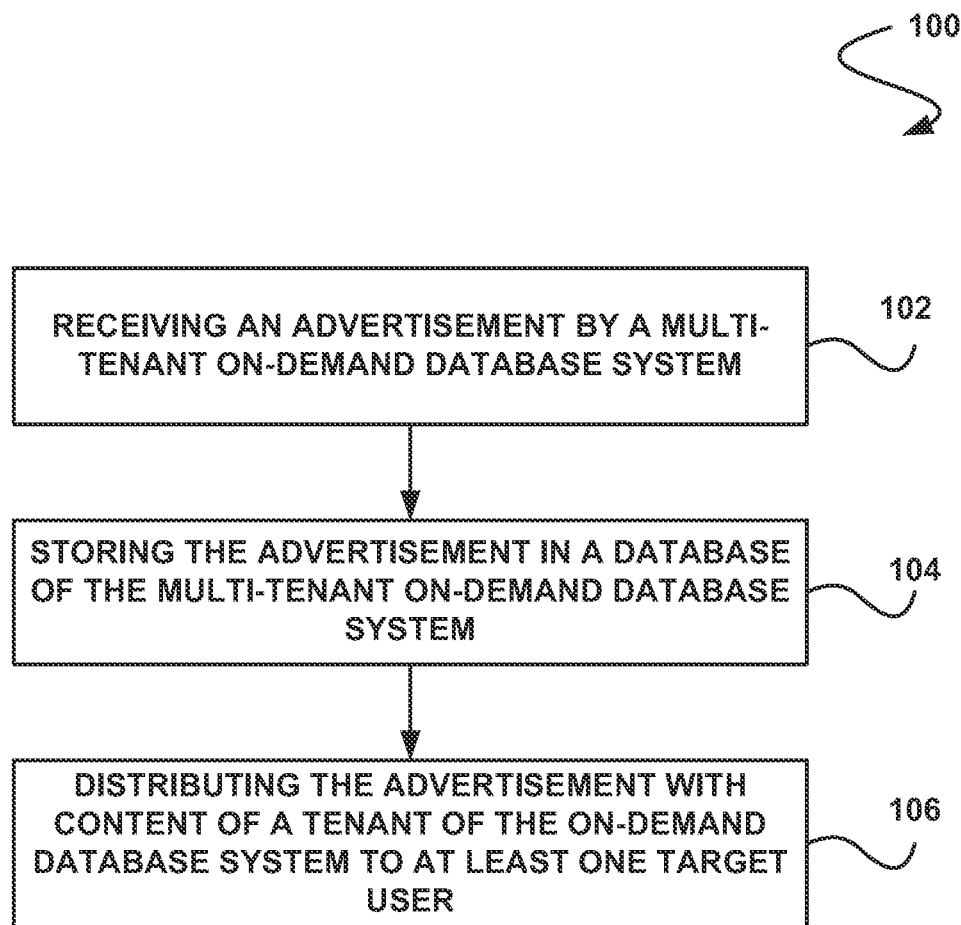
FIG. 1 illustrates a method for advertisement distribution using a multi-tenant on-demand database system, in accordance with an embodiment.

FIG. 1 illustrates a method 100 for advertisement distribution using a multi-tenant on-demand database system, in accordance with an embodiment. As shown in operation 102, an advertisement is received by a multi-tenant on-demand database system. In the context of the present description, the advertisement may include any promotional content (e.g. for a product, service, event, etc.). For example, the advertisement may be an informative presentation of information, a text advertisement, an image advertisement, a video advertisement, link units which are sets of clickable links to topic pages related to page content, themed units which are regular text ads with graphic treatments that change seasonally and by geography, gadget ads that include customized mini-sites, a coupon, an offer, a promotion, etc.

In one embodiment, the advertisement may be received by the multi-tenant on-demand database system by being created using one or more components of the multi-tenant on-demand database system. Accordingly, the multi-tenant on-demand database system may optionally provide a platform upon which the advertisement may be created. As a further option, the advertisement may be created by a tenant (e.g. customer, user, etc.) of the multi-tenant on-demand database system.

In another embodiment, the advertisement may be created externally from the multi-tenant on-demand database system and thus received by the multi-tenant on-demand database system as an already created advertisement. With respect to such embodiment, the advertisement may be created by a tenant of the multi-tenant on-demand database system or a third party to the multi-tenant on-demand database system. Such third party may be an advertiser, retailer, service provider, and/or any other entity that is not necessarily a tenant (i.e. that is a non-tenant) of the multi-tenant on-demand database system.

In any case, the advertisement may be received by the multi-tenant on-demand database system via an interface of the multi-tenant on-demand database system. For example, a computer device external to the multi-tenant on-demand database system (e.g. used by a tenant or third party) may transmit (e.g. uploading, etc.) an already created advertisement to the multi-tenant on-demand database system via the interface. As another example, the computer device may transmit instructions for defining the advertisement to the multi-tenant on-demand database system via the interface.

Additionally, as shown in operation 104, the advertisement is stored in a database of the multi-tenant on-demand database system. The advertisement database may be located in a portion of tenant data storage or system data storage, as described in more detail below. For example, where the advertisement is received by a tenant, the advertisement may optionally be stored in a portion of the tenant data storage that is specific to the tenant. As another example, where the advertisement is received by a third party, the advertisement may optionally be stored in a portion of the system data storage that is shared by tenants of the multi-tenant on-demand database system.

Further, as shown in operation 106, the advertisement is distributed with content of a tenant of the multi-tenant on-demand database system to at least one target user. It should be noted that where the advertisement is received by a tenant, the advertisement may be distributed with content of that same tenant or a different tenant of the multi-tenant on-demand database system. Moreover, the content of the tenant may be a website of the tenant, a report of the tenant, a message (e.g. email, text, etc.) of the tenant, or any other content of the tenant with which the advertisement may be distributed.

Examples of the manner in which the advertisement and tenant content may be selected for distribution will be described below with reference to the subsequent figures. Just by way of example, the advertisement and content may be selected manually by the tenant for distribution thereof. As another example, the advertisement and content may be selected automatically by the multi-tenant on-demand database system for distribution thereof.

Still yet, the mode of distribution may also vary (e.g. per the desires of the tenant, advertiser, etc.). In one embodiment, the advertisement may be distributed with the content of the tenant via one or more services provided by the multi-tenant on-demand database system. Such service may be a social networking site provided by the multi-tenant on-demand database system, a platform of the multi-tenant on-demand database system hosting tenant-specific websites, an application of the multi-tenant on-demand database system allowing collaboration on projects among tenants and/or non-tenants of the multi-tenant on-demand database system, a mobile messaging service of the multi-tenant on-demand database system, a sales platform of the multi-tenant on-demand database system, an application development platform of the multi-tenant on-demand database system, an application exchange platform of the multi-tenant on-demand database system, etc. In this way, a single instance of an advertisement created, or in any case stored, by the multi-tenant on-demand database system may be distributed any number of different times optionally using different communication channels (e.g. services) to mobile devices, computers, etc. of target users.

Moreover, the one or more target users to which the advertisement is distributed may be any user having a device (e.g. computer, mobile device, etc.) capable of receiving the advertisement with the content. Optionally, the target user may be identified from a repository of user information stored by the multi-tenant on-demand database system. Such repository of user information may identify users (e.g. tenants and/or non-tenants) of the multi-tenant on-demand database system, customers of tenants of the multi-tenant on-demand database system, etc. Just by way of example, the users could be a portal user who has a license to use the multi-tenant on-demand database system, or a guest user (e.g. a visitor or other un-authenticated user to the multi-tenant on-demand database system), or a regular multi-tenant on-demand database system user that has an account, login, etc. with the multi-tenant on-demand database system. In this way, information already stored by the multi-tenant on-demand database system which identifies various users (and optionally profiles associated therewith) may be leveraged to target specific ones of those users for up-sell or cross-sell opportunities associated with the advertisement.

In one embodiment, the target user may be identified from a portion of the repository that stores user information specific to the tenant associated with the content. For example, the target user may be identified from the tenant-specific user information when the advertisement is received by the tenant (e.g. for targeting users associated with the tenant). In such embodiment, user information may be stored in tenant data storage. In another embodiment (e.g. where the advertisement is received by the third party), the target user may be identified from system data storage that is shared amongst the tenants of the multi-tenant on-demand database system.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
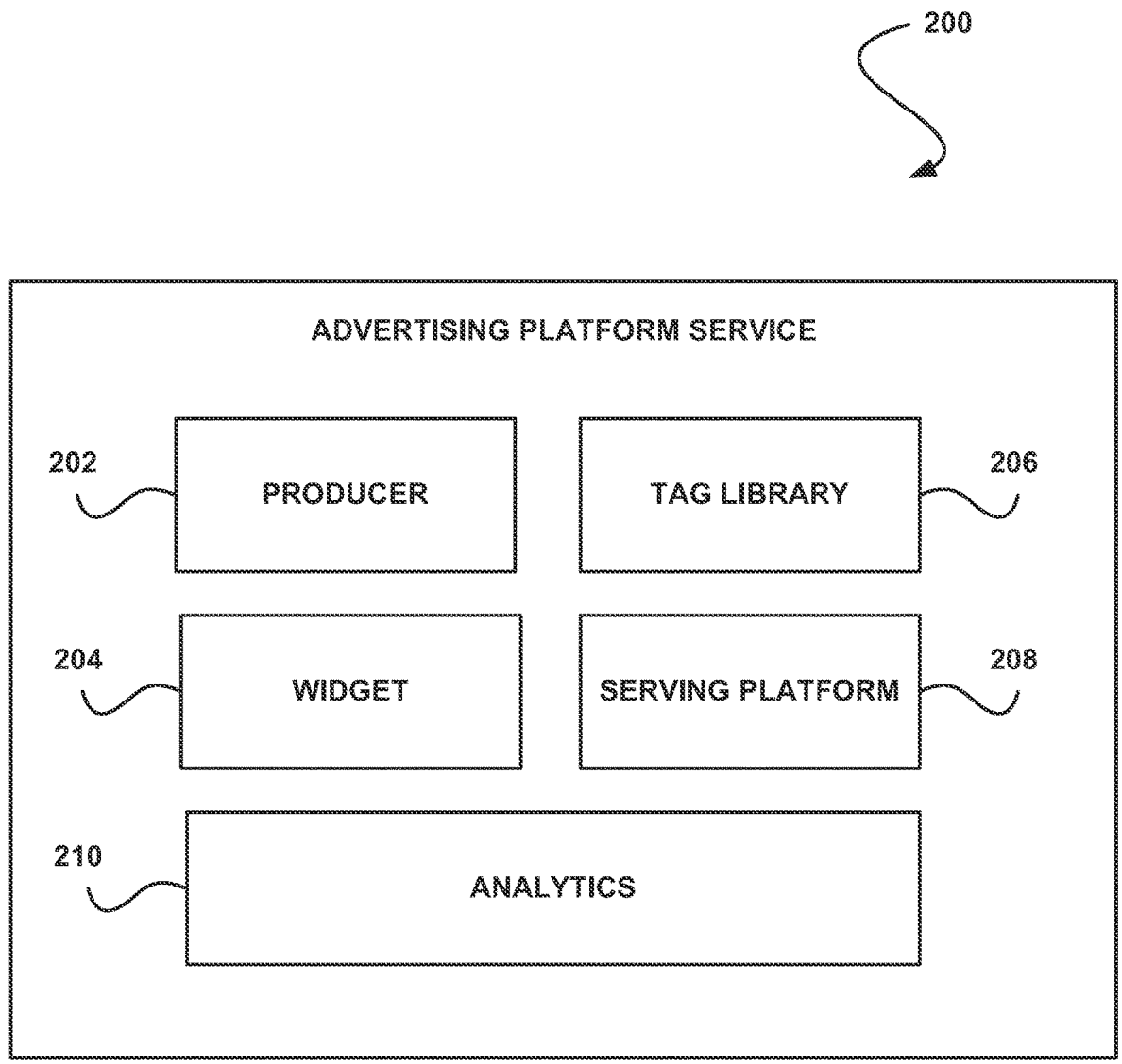
FIG. 2 illustrates an advertising platform service of a multi-tenant on-demand database system for advertisement distribution, in accordance with an embodiment.

FIG. 2 illustrates an advertising platform service 200 of a multi-tenant on-demand database system for advertisement distribution, in accordance with an embodiment. As an option, the present system 200 may be implemented to carry out the method 100 of FIG. 1. Of course, however, the system 200 may be implemented in any desired environment. It should also be noted that the aforementioned definitions may apply during the present description.

Figure 5:
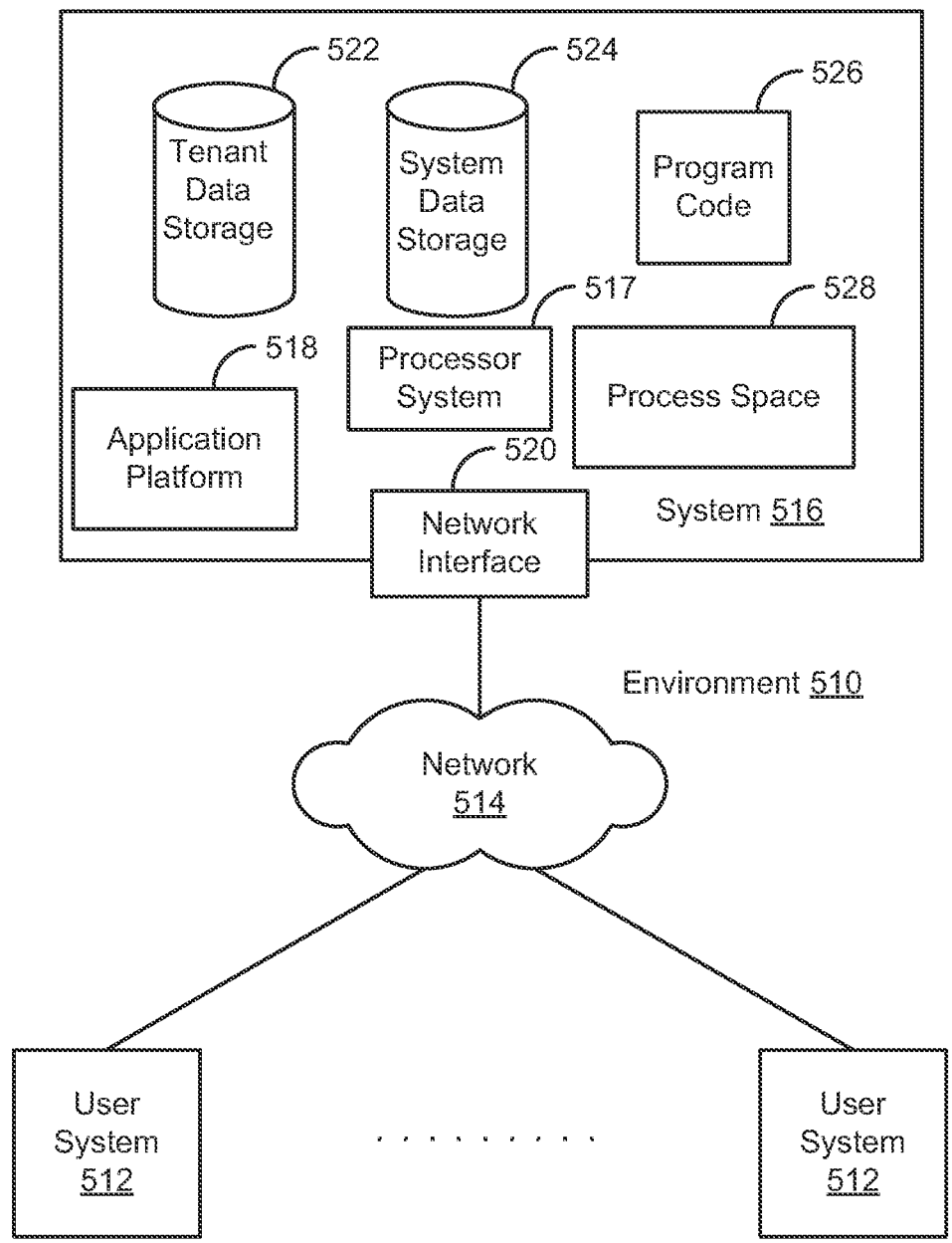
FIG. 5 illustrates a block diagram of an example of an environment wherein an on-demand database service might be used.

As an option, an advertising platform service 200 may be a component (e.g. application, etc.) of an application platform of the multi-tenant on-demand database system (e.g. item 518 of FIG. 5). Thus, the advertising platform service 200 may be managed, maintained, etc. by administrators of the multi-tenant on-demand database system. It should be noted that the advertising platform service 200 may be implemented on a single server, multiple servers, etc. Further, the advertising platform service 200 may communicate with other components of the multi-tenant on-demand database system, such as other applications of the multi-tenant on-demand database system (e.g. provided by application platform 518 in FIG. 5), tenant data storage of the multi-tenant on-demand database system (e.g. item 522 of FIG. 5), system data storage of the multi-tenant on-demand database system (e.g. item 524 of FIG. 5), etc.

The advertising platform service 200 includes a producer component 202, widget component 204, tag library 206, serving platform 208, and analytics component 210. The producer component 202 is a tool for users to create advertisements. Accordingly, the producer component 202 may be a series of user interfaces and underlying code capable of being used by users to design and assemble advertisements (e.g. using HTML5, CSS3, Javascript, etc.).

The widget component 204 is a tool for tenants to reserve space within their content for use is distributing advertisements. Tenants may use the tool to insert an advertisement widget into a portion of their content (e.g. at a particular location, etc.). When the content is distributed, the advertisement widget may be replaced with an advertisement for display within the content.

The tag library 206 is a repository storing tags associated with or capable of being associated with content. The tags may indicate properties for content, such as a subject matter of the content, a category of the content, a targeted audience for the content, etc. Tenants developing content may associate tags with the developed content. Thus, the content and associated tags may be stored with reference to one another. Advertisements predetermined to be associated with tag(s) of a particular content may then be distributed with that particular content (e.g. via an advertisement widget, etc.).

The serving platform 208 includes a plurality of objects for storing various information to be used for distributing the advertisements with the tenant content. For example, the objects may store indicators of a target audience, demographics, advertisements, algorithms, advertisement metrics, etc. The information may be defined by tenants of the multi-tenant on-demand database system.

The analytics component 210 may gather advertisement metrics, analyze the advertisement metrics (e.g. via the algorithms provided by the serving platform 208), and report results of the analysis. For example, the reports may be on key insights into user engagement with the advertisements, average time spent by users on the advertisements, number of user clicks per advertisement, pages viewed per advertisement, unique visitor metrics per advertisement, etc. The analytics component 210 may allow analysis of target user behavior upon receipt of an advertisement, for use by tenants in honing advertisement strategies, etc.

In use, the advertising platform service 200 may communicate with services of the multi-tenant on-demand database system for distributing the advertisements with the tenant content. Thus, the advertisements may be distributed with the tenant content via the various services of the multi-tenant on-demand database system. Each service may be a social networking site provided by the multi-tenant on-demand database system, a platform of the multi-tenant on-demand database system hosting tenant-specific websites, an application of the mufti-tenant on-demand database system allowing collaboration on projects among tenants and/or non-tenants of the multi-tenant on-demand database system, a mobile messaging service of the multi-tenant on-demand database system, a sales platform of the multi-tenant on-demand database system, an application development platform of the multi-tenant on-demand database system, an application exchange platform of the multi-tenant on-demand database system, etc.

In the context of the multi-tenant on-demand database system being Salesforce.com™, these service may include Force.com, Heroku, Chatter, Dimdim, App Exchange, Mobile Devices and Sites, Service Cloud, Sales Cloud, etc.

As an option, revenue generated from distribution of the advertisements may be shared between the tenants and the multi-tenant on-demand database system. For example, when an advertiser is charged a fee for distribution of their advertisement with a particular tenant's content, that tenant may share the paid fee with the multi-tenant on-demand database system.

Figure 3:
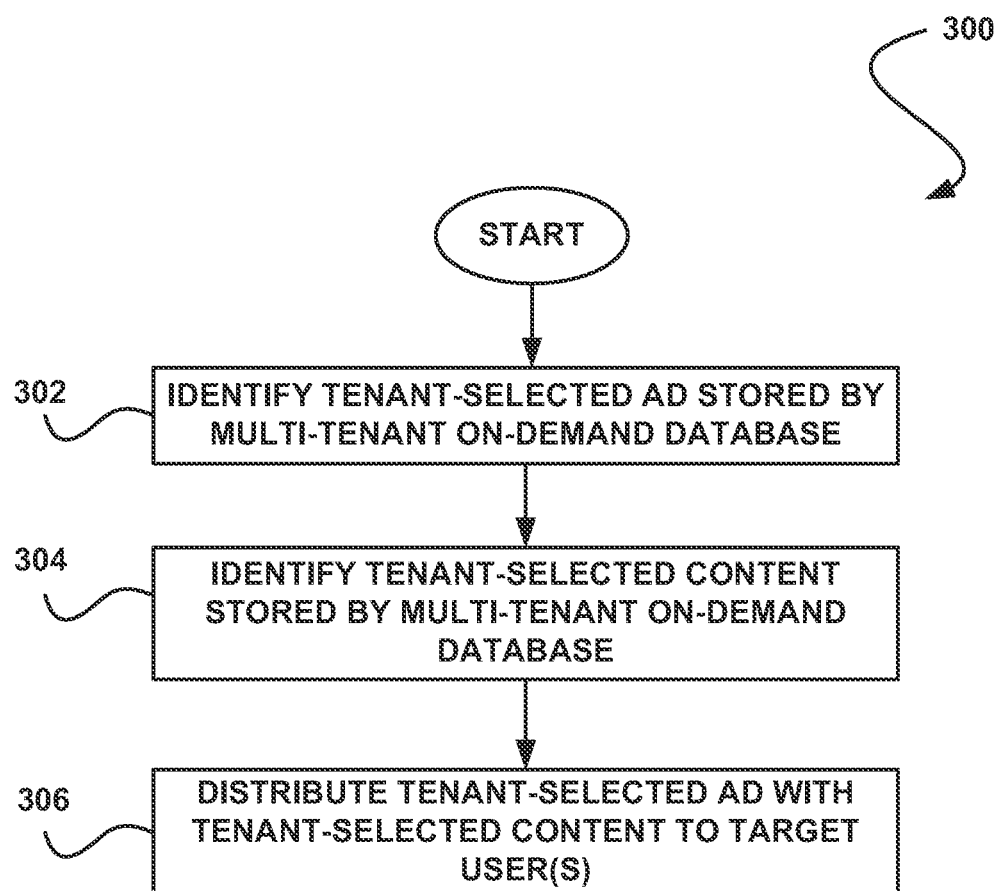
FIG. 3 illustrates a method distributing a tenant-selected advertisement with tenant-selected content, in accordance with an embodiment.

FIG. 3 illustrates a method 300 distributing a tenant-selected advertisement with tenant-selected content, in accordance with an embodiment. As an option, the method 300 may be carried Gut in the context of FIGS. 1-2. For example, the method 300 may be carried out per specific input provided by a tenant of a multi-tenant on-demand database system. As an option, the tenant may be required to be a subscriber of an advertisement service offered by the multi-tenant on-demand database system in order to drive the current method 300. Thus, revenue may be received by the multi-tenant on-demand database system from a subscription fee paid by the tenant. Further, the method 300 may be carried out by the multi-tenant on-demand database system. Of course, however, the method 300 may be carried out in any desired environment. Again, it should be noted that the aforementioned definitions may apply during the present description.

As shown in operation 302, a tenant-selected advertisement stored by a multi-tenant on-demand database system is identified. For example, the advertisement may be identified in response to the tenant selecting the advertisement. As another example, the advertisement may be identified using a reference to the advertisement included in content of the tenant. In any case, the advertisement is stored by a multi-tenant on-demand database system, and selected from a repository of the multi-tenant on-demand database system.

Further, tenant-selected content stored by the multi-tenant on-demand database system is identified, as shown in operation 304. In one embodiment, the content may be selected by the tenant for inserting the tenant-selected advertisement therein. In another embodiment where the content already includes a reference to the advertisement, the content may be selected for distribution thereof with the advertisement. It should be noted that the content may be any content that is accessible to the tenant and optionally stored by the multi-tenant on-demand database system (e.g. in tenant data storage, etc.)

Still yet, as shown in operation 306, the tenant-selected advertisement is distributed with the tenant-selected content to one or more target users. In this way, the advertisement may be distributed with the content in response to a manual selection by the tenant of the advertisement and the content for distribution. It should be noted that the tenant may select any communication channels (e.g. multi-tenant on-demand database system services to distribute the advertisement and associated content.

By allowing tenant configured distribution of advertisements, in the manner described above, the tenant can generate new leads, improve brand awareness, offer coupons, up-sell or cross-sell to their existing customers, etc. Moreover, the tenant can capture useful marketing data related to the advertising, via advertisement-related analytics provided by the multi-tenant on-demand database system, and may keep it internally for further data mining and subsequently, for better targeted advertising.

In one exemplary use case, when a tenant organizes an event, that tenant can offer sponsors of the event an opportunity to advertise to the event's audience and can distribute an advertisement with promotional content for the event. In another example use case, the tenant may serve targeted advertisements through their public sites and customer self-service portals to non-tenants of the multi-tenant on-demand database system.

Figure 4:
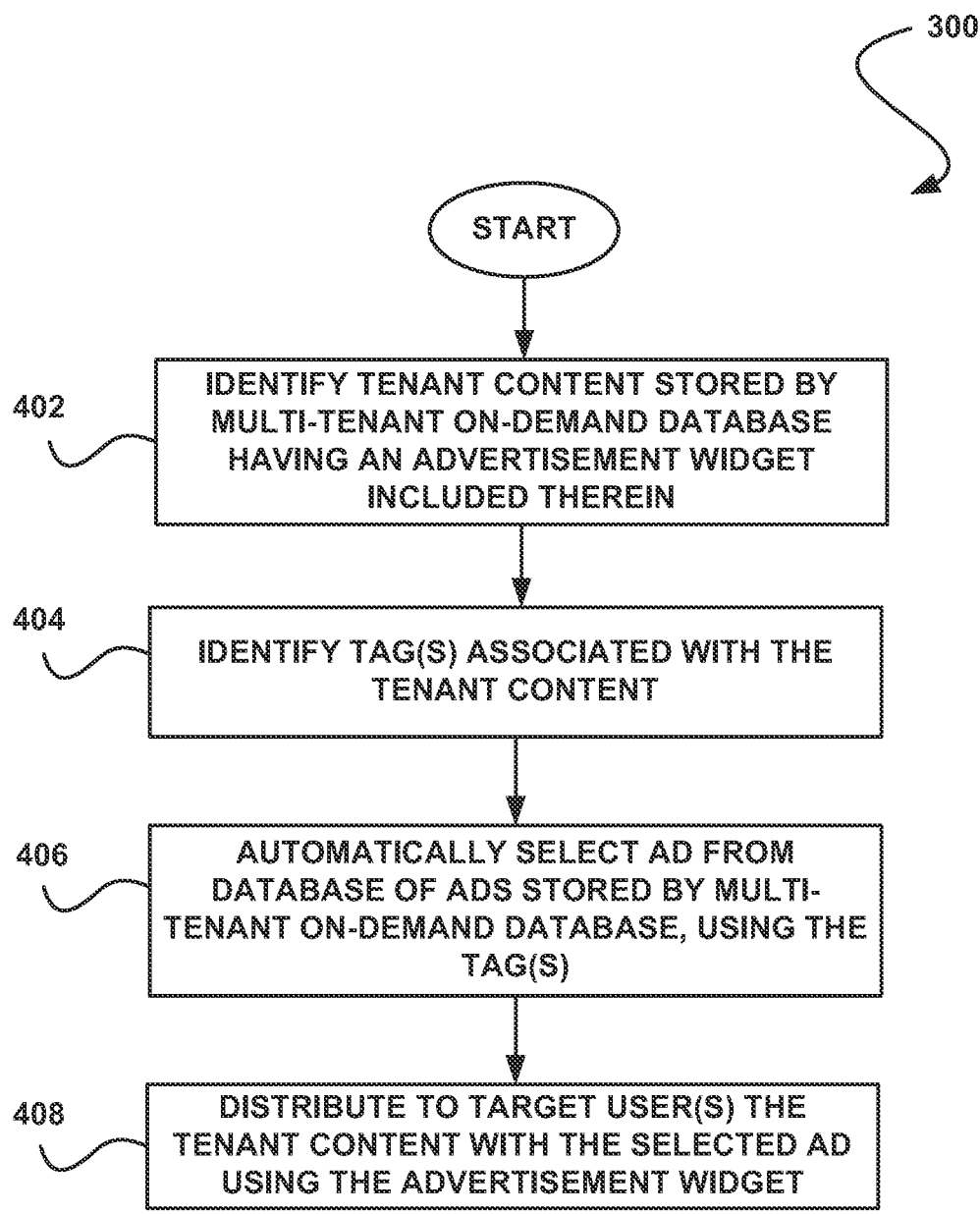
FIG. 4 illustrates a method for distributing a system-selected with tenant content, in accordance with an embodiment.

FIG. 4 illustrates a method 400 for distributing a system-selected with tenant content, in accordance with an embodiment. As an option, the method 400 may be carried out in the context of FIGS. 1-2. For example, the method 300 may be carried out automatically by an application of a multi-tenant on-demand database system, such that user intervention is not required to drive the current method 400. As an option, revenue may be received by the multi-tenant on-demand database system from advertisers when their advertisements are distributed, and may be shared with the tenants that allow advertisements to be distributed with their content. Of course, however, the method 400 may be carried out in any desired environment. Again, it should be noted that the aforementioned definitions may apply during the present description.

As shown in operation 402, tenant content stored by a multi-tenant on-demand database system that has an advertisement widget included therein is identified. For example, the content may be created by a tenant of the multi-tenant on-demand database system, tenant reserved space for an advertisement in the content using an advertisement widget. As an option, the tenant content may be specific to the tenant, and thus not necessarily shared with other tenants of the multi-tenant on-demand database system.

Additionally, as shown in operation 404, one or more tags associated with the tenant content are identified. In one embodiment, the tags may be manually associated with the tenant content by the tenant during creation of the tenant content. In another embodiment, the tags may be automatically associated with the tenant content based on a type of the tenant content (e.g. website, etc.), subject matter of the tenant content, a tenant description of the tenant content, etc. The tags may indicate properties of the tenant content, as an option. As another option, the tags may indicate properties of an advertisement permitted to be distributed with the tenant content.

Furthermore, an advertisement is automatically selected from a database of advertisements stored by the multi-tenant on-demand database system, using the tags. Note operation 406. For example, an advertisement in the database that is associated with the tags may be automatically selected by the multi-tenant on-demand database system. Such advertisement may have, or be predefined to be associated with, properties matching the properties indicated by the tags, for example. Accordingly, the advertisement that is automatically selected may be based on tags associated with the tenant content, and may therefore be relevant to the tenant content.

Still yet, as shown in operation 408, the tenant content is distributed with the selected advertisement using the advertisement widget to one or more target users. As noted above, the advertisement widget may be included in a particular portion of the tenant content, such that the advertisement is distributed with the tenant content using the advertisement widget by incorporating the advertisement in that particular portion of the tenant content. It should be noted that the multi-tenant on-demand database system may select any communication channels (e.g. multi-tenant on-demand database system services) to distribute the advertisement and associated tenant content.

By allowing the automatic distribution of advertisements with tenant content, in the manner described above, a tenant may reserve space on their content for any advertisement such that when the tenant content is distributed an automatically selected advertisement may be included in that reserved space. The optional ability of the tenant to associate tags with the content may allow the tenant to control, in part, a type, category, etc. of advertisements distributed with the content.

In one exemplary use case, a web page on a tenant's gaming web site might display advertisements for games from game makers. These advertisements may be displayed in space that tenant has set aside on their web site. As an option, the advertiser that created the advertisement may advertisement-specific analytics to customize and fine tune the advertising to their target audience.

System Overview

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists, User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with budding and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower, permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, IMP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MIS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
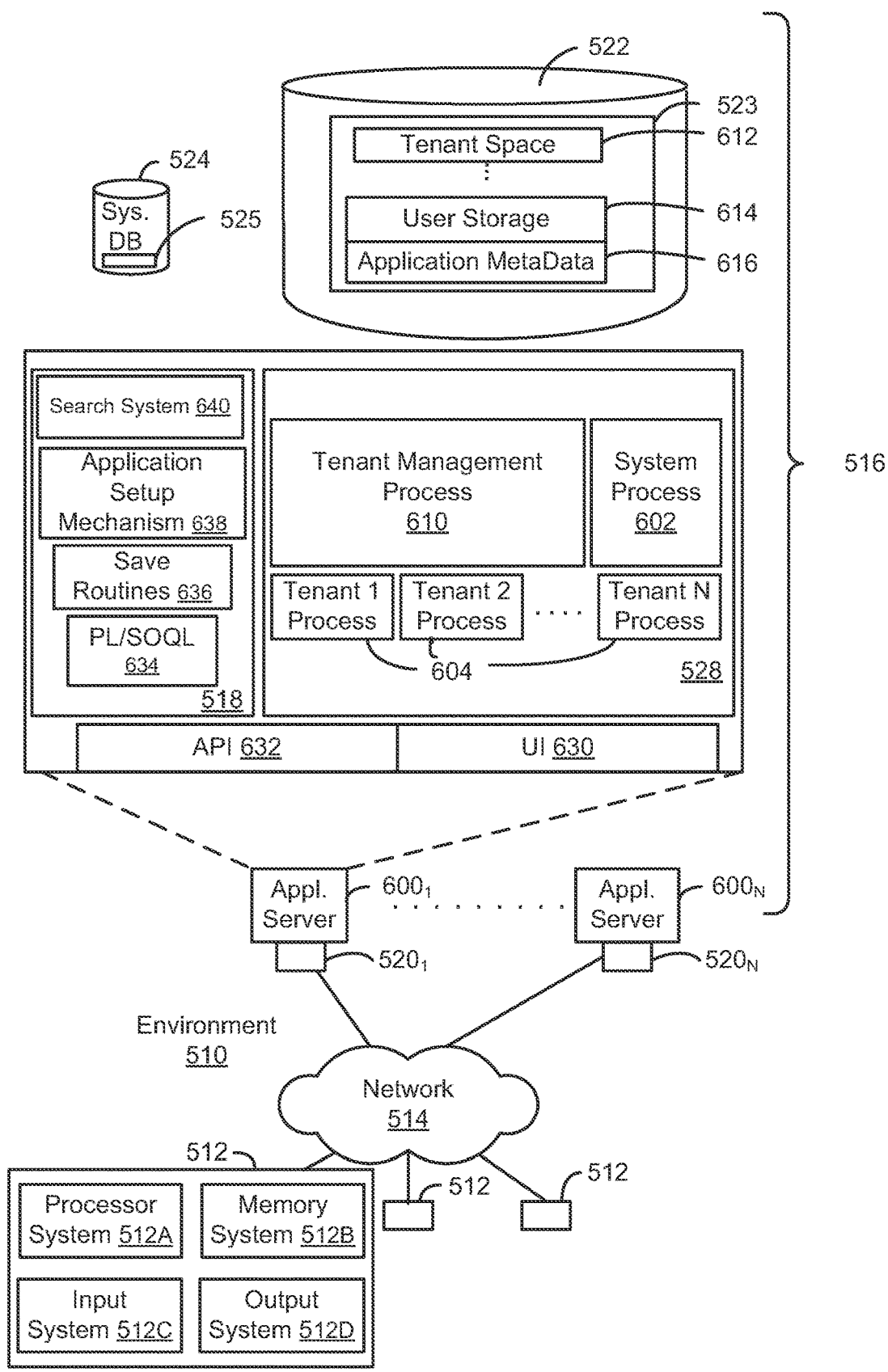
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. As an option, the application platform 518 may further include a search system 540. Invocations to such applications may be coded using PL/SOQL 634 that provides a programming language style interface extension to API 632. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another, table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable medium having computer instructions stored thereon that are capable of being executed by a computer system to cause operations comprising:
   storing, by a multi-tenant database system, content for a plurality of tenants, wherein the content is stored using at least one shared database table that includes one or more rows for each of multiple tenants, wherein the database system is configured such that private content of one tenant is not accessible to other tenants;
   storing, by the multi-tenant database system, a first set of supplemental content of a first type that is accessible to multiple ones of the plurality of tenants;
   storing, by the multi-tenant database system, a second set of supplemental content of a second type that is tenant-specific such that portions of the second set of supplemental content corresponding to various ones of the plurality of tenants are not accessible to other ones of the plurality of tenants;
   receiving information from a first tenant that indicates properties of supplemental content to be provided in response to requests for content of the first tenant, including indicating to provide the first type of supplemental content with content of the first tenant;
   receiving information from a second tenant that indicates properties of supplemental content to be provided in response to requests for content of the second tenant, including indicating to provide the second type of supplemental content and not the first type of supplemental content with content of the second tenant;
   storing the information from the first and second tenants;
   in response to respective requests for content of the first and second tenants, a first module of the multi-tenant database system retrieving content from the at least one shared database table;
   in response to detecting that the requested content includes a widget that specifies supplemental content, a second module determining supplemental content based on the stored information from the first and second tenants, including:
      determining to distribute content from the first set of supplemental content for the first tenant based on the information from the first tenant; and
      determining to distribute only content from the second set of supplemental content in response to the request for content of the second tenant based on the information from the second tenant; and
   automatically providing the determined supplemental content for the first and second tenants with the retrieved content in response to the requests, thereby securing supplemental content of the second tenant in the second set of supplemental content from being accessed by other ones of the tenants and thereby ensuring that supplemental content from other tenants is not provided with content of the second tenant.

2. The non-transitory computer-readable medium of claim 1, wherein the operations further comprise receiving user input of the information that indicates properties of supplemental content to be provided from a user associated with the second tenant.

3. The non-transitory computer-readable medium of claim 1, wherein at least a portion of the second set of supplemental content is tenant-created.

4. The non-transitory computer-readable medium of claim 1, wherein at least a portion of the supplemental content is created externally from the computer system.

5. The non-transitory computer-readable medium of claim 1, wherein the determined supplemental content and the content of the second tenant are provided for display via a web interface.

6. The non-transitory computer-readable medium of claim 1, wherein the determining and automatically providing are performed multiple times, for different interfaces associated with the second tenant, using different content of the second tenant and different supplemental content.

7. A method, comprising:
   storing, by a multi-tenant database system, content for a plurality of tenants, wherein the content is stored using at least one shared database table that includes one or more rows for each of multiple tenants, wherein the system is configured such that private content of one tenant is not accessible to other tenants;
   storing, by the multi-tenant database system, a first set of supplemental content of a first type that is accessible to multiple ones of the plurality of tenants;
   storing, by the multi-tenant database system, a second set of supplemental content of a second type that is tenant-specific such that portions of the second set of supplemental content corresponding to various ones of the plurality of tenants are not accessible to other ones of the plurality of tenants;
   receiving, by the multi-tenant database system, information from a first tenant that indicates properties of supplemental content to be provided in response to requests for content of the first tenant, including indicating to provide the first type of supplemental content with content of the first tenant;
   receiving, by the multi-tenant database system, information from a second tenant that indicates properties of supplemental content to be provided in response to requests for content of the second tenant, including indicating to provide the second type of supplemental content and not the first type of supplemental content with content of the second tenant;

storing, by the multi-tenant database system, the information from the first and second tenants;

in response to respective requests for content of the first and second tenants, a first module of the multi-tenant database system retrieving content from the at least one shared database table;

in response to detecting that the requested content includes a widget that specifies supplemental content, a second module of the multi-tenant database system determining supplemental content based on the information from the first and second tenants, including:

determining to distribute content from the first set of supplemental content for the first tenant based on the information from the first tenant; and determining to distribute only content from the second set of supplemental content in response to the request for content of the second tenant based on the information from the second tenant; and automatically providing, by the multi-tenant database system, the determined supplemental content for the first and second tenants with the retrieved content in response to the requests, thereby securing supplemental content of the second tenant in the second set of supplemental content from being accessed by other ones of the tenants and thereby ensuring that supplemental content from other tenants is not provided with content of the second tenant.

8. The method of claim 7, further comprising receiving user input of the information that indicates properties of supplemental content to be provided for association with the content of the second tenant.

9. The method of claim 7, wherein the determined supplemental content and the content of the second tenant are provided for display via a web interface.

10. The method of claim 7, wherein the determining and automatically providing are performed multiple times, for different interfaces associated with the second tenant, using different content of the second tenant and different supplemental content.

11. A system, comprising:
one or more storage elements configured to store at least one database table, wherein the at least one database table includes content for a plurality of tenants and wherein the content includes one or more rows for each of multiple tenants, wherein the system is configured such that private content of one tenant is not accessible to other tenants;

one or more processing elements; and one or more memories having program instructions stored thereon that are accessible by the one or more processing elements to perform operations comprising:

storing a first set of supplemental content of a first type that is accessible to multiple ones of the plurality of tenants;

storing a second set of supplemental content of a second type that is tenant-specific such that portions of the second set of supplemental content corresponding to various ones of the plurality of tenants are not accessible to other ones of the plurality of tenants;

receiving information from a first tenant that indicates properties of supplemental content to be provided in response to requests for content of the first tenant, including indicating to provide the first type of supplemental content with content of the first tenant;

receiving information from a second tenant that indicates properties of supplemental content to be provided in response to requests for content of the second tenant including indicating to provide the second type of supplemental content and not the first type of supplemental content with content of the second tenant;

storing the information from the first and second tenants;

in response to respective requests for content of the first and second tenants, a first module of the system retrieving the content from the at least one shared database table;

in response to detecting that the requested content includes a widget that specifies supplemental content, a second module of the system determining supplemental content based on the information from the first and second tenants, including:

determining to distribute content from the first set of supplemental content for the first tenant based on the information from the first tenant; and determining to distribute only content from the second set of supplemental content in response to the request for content of the second tenant based on the information from the second tenant; and automatically providing the determined supplemental content for the first and second tenants with the retrieved content in response to the requests, thereby securing supplemental content of the second tenant in the second set of supplemental content from being accessed by other ones of the tenants and thereby ensuring that supplemental content from other tenants is not provided with content of the second tenant.

12. The system of claim 11, wherein the operations further comprise receiving user input of the information that indicates properties of supplemental content to be provided from a user associated with the second tenant.

13. The system of claim 11, wherein the determined supplemental content is embedded into the content of the second tenant for display.

* * * * *